United States Patent

[11] 3,549,928

| [72] | Inventor | Theodore F. Knapp, Farmington, Mich. |
|---|---|---|
| [21] | Appl. No. | 288,152 |
| [22] | Filed | June 17, 1963 |
| [45] | Patented | Dec. 22, 1970 |
| [73] | Assignee | Dura Corporation, a wholly-owned subsidiary of Walter Kidde & Company Inc. Oak Park, Mich. a corporation of New York. by mesne assignments |

[54] ARMATURE
26 Claims, 10 Drawing Figs.

| [52] | U.S. Cl. | 310/268 |
|---|---|---|
| [51] | Int. Cl. | H02k 1/22 |
| [50] | Field of Search | 310/268(Cursory) PC; 29/155.53, (Cursory) |

[56] References Cited
UNITED STATES PATENTS

| 2,384,489 | 11/1945 | Pancher | 29/155.53 |
|---|---|---|---|
| 2,483,024 | 9/1949 | Roters | 29/155.53 |
| 3,023,334 | 2/1962 | Burr et al. | 310/268 |
| 3,050,650 | 8/1962 | Henry-Baudot | 310/268 |
| 3,095,516 | 6/1963 | Moressee | 310/268 |
| 3,096,455 | 7/1963 | Hahn | 310/268 |
| 3,109,114 | 10/1963 | Henry-Baudot | 310/268 |
| 3,231,774 | 1/1966 | Henry-Baudot | 310/268 |

*Primary Examiner*—D. F. Dugan
*Assistant Examiner*—J. W. Gibbs
*Attorney*—Harness, Dickey & Pierce ABSTRACT: Disclosed are disc-type armatures formed from a plurality of layers of thin conductive sheet material insulated from one another. Each layer of conductive sheet material comprises a predetermined spaced pattern of individual conductor segments which form half-turn of the armature winding coils. The half-turn conductor segments in each layer are electrically connected to the individual conductor segments in the other layers in series relationship to form a continuous wave-type winding.

PATENTED DEC 22 1970

INVENTOR.
THEODORE F. KNAPP
BY
*Harness, Dickey & Pierce*
ATTORNEYS.

INVENTOR
THEODORE F. KNAPP
BY
ATTORNEYS.

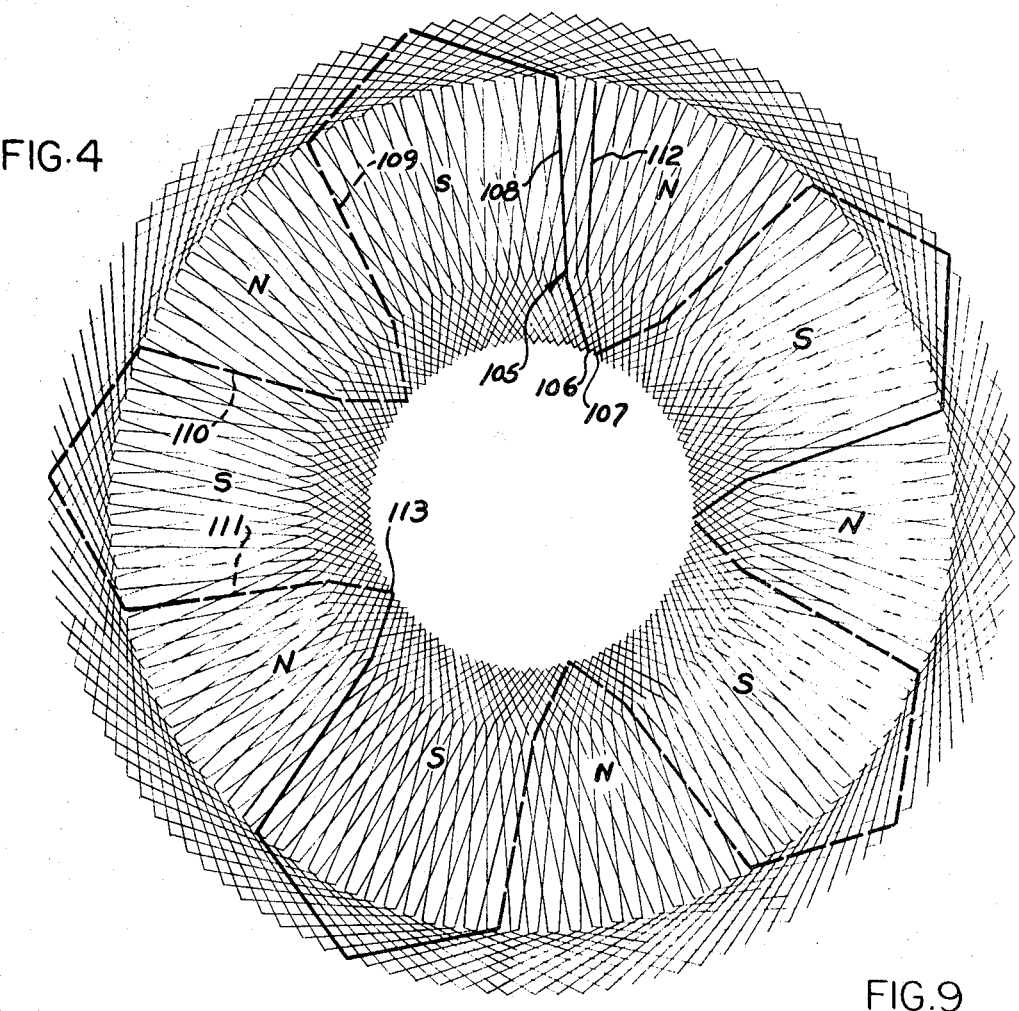
FIG. 4
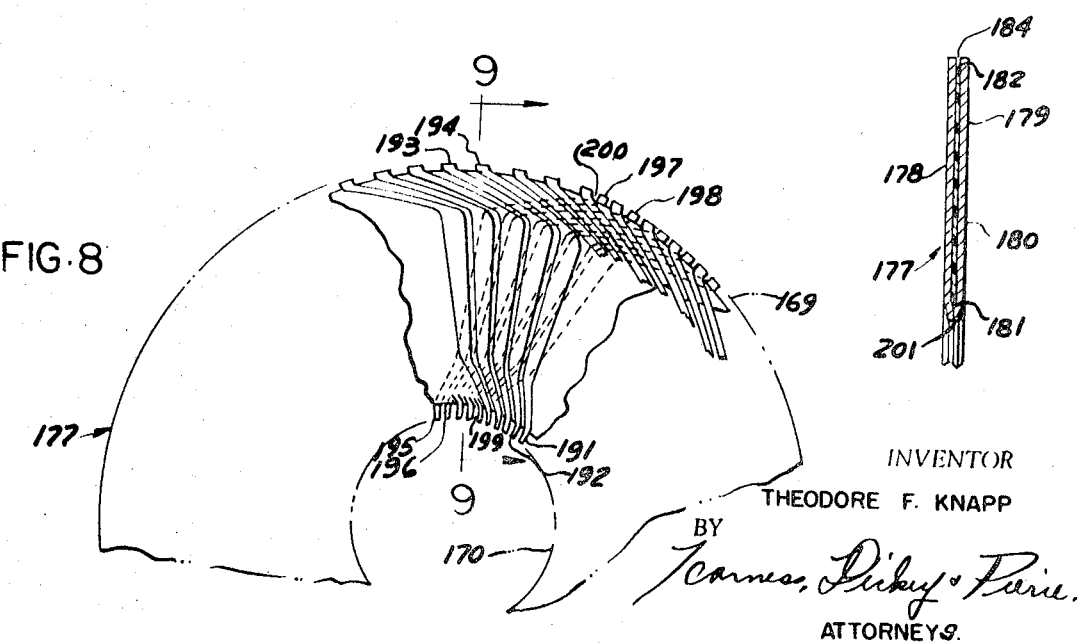
FIG. 8
FIG. 9
INVENTOR
THEODORE F. KNAPP
BY
Carnes, Dickey & Pierce
ATTORNEYS.

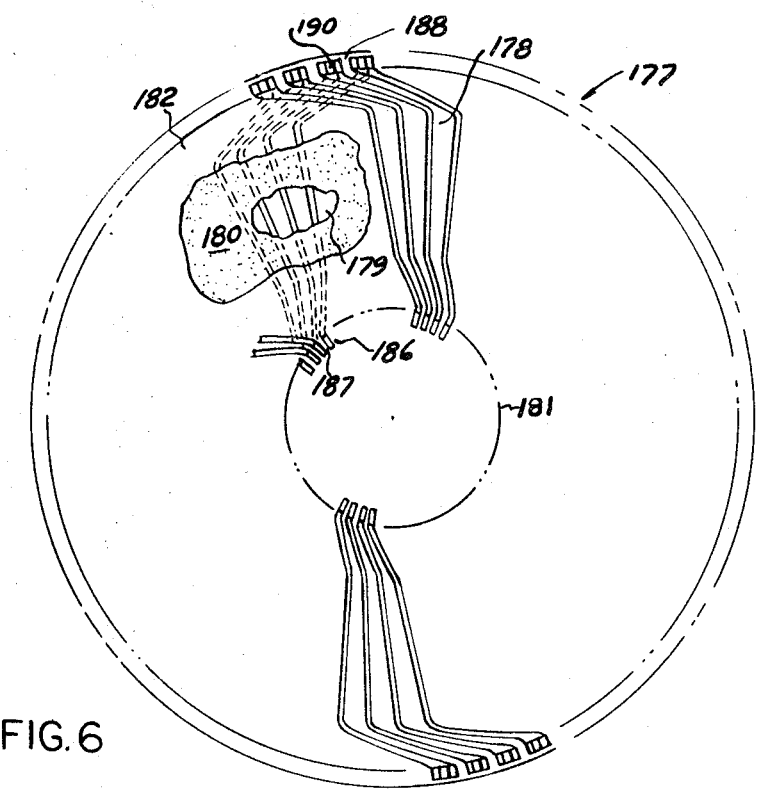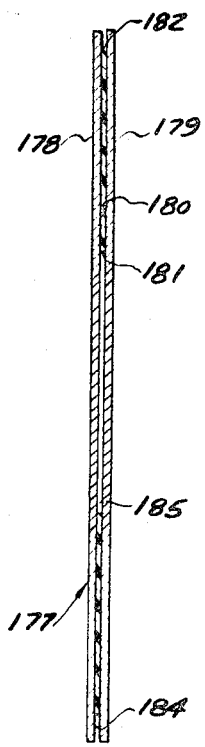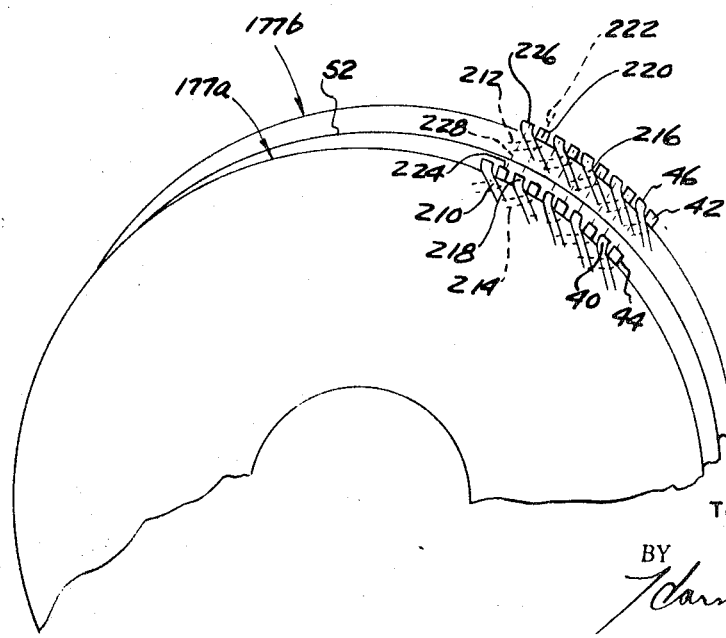
FIG. 6
FIG. 7
FIG. 10
INVENTOR
THEODORE F. KNAPP

ARMATURE

This invention relates to rotating electric machinery and more particularly to a disc-type armature and methods of manufacturing a disc-type armature.

The principles of the present invention have particular utility in extremely compact motor units such as, for example, small motors used to drive automobile accessories or the like. Accessory motors particularly well suited to utilization of the present invention are, in general, mounted in cylindrical "pancake-type" casings of limited diameter. The motors operate from a fixed or limited relatively low DC voltage and utilize magnetic fields produced by permanent magnets which have limited field strength. Operating speeds are relatively low whereas the torque produced per ampere must be relatively high.

A general object is to provide a motor having exceptional operating characteristics within limitations imposed by size, available voltage, magnetic field strength, etc.

A more specific object is to provide a new and improved disc-type armature having a wave winding formed from multiple turn coils.

Another object is to provide a disc-type armature which is suitable for mass production at low cost. A further object is to provide a disc-type armature which has a maximum number of coils formed from a maximum number of torque producing turns.

Still another object is to provide a motor and a disc-type motor armature of minimum thickness having maximum torque producing capability.

An additional object is to provide a disc-type armature having increased strength and rigidity.

A supplementary object is to provide methods of manufacturing a disc-type armature facilitating assembly and formation of a wave winding having multiple turn coils and insuring the attainment of a disc-type armature having the attributes of thinness, diametrical smallness, high torque capability, rigidity, durability, etc.

In fulfillment of the aforementioned objects, disc-type armatures incorporating the inventive principles are formed from a plurality of layers of thin conductive sheet material insulated from one another. Each layer of conductive sheet material comprises a predetermined spaced pattern of individual conductor segments which form half turns of the armature winding coils. The half turn conductor segments in each layer extend generally radially and are nonintersecting. Individual conductor segments of each layer are electrically connected to the individual conductor segments in the other layers in series relationship to form a continuous wave type winding.

More specifically, the wave winding is formed from conductor segments in more than two layers, preferably four layers, and the winding is utilized in a motor having a magnetic field formed from an odd number of pole pairs. Each layer of conductor segments has an identical conductor pattern although the orientation of the conductor segments relative to one another varies. The winding is formed from a total number of conductor segments divisible by the number of layers to provide an equal number of half turn conductor segments in each layer. Half turn conductor segments in adjacent layers are connected to each other at one end along either the inner or outer periphery of the disc-type armature and the ends of the half turn conductor segments in the outermost layers are connected to complete a continuous current path progressing alternately from layer to layer repetitively to define a wave-type winding having multiple turn coils.

An illustrative embodiment of the invention is shown on the accompanying drawing wherein:

FIG. 4 is a schematic illustration of the armature winding;

FIG. 6 is a partial side elevational view, with parts broken away, of a pair of the assembly parts shown in FIG. 5 reversely positioned on opposite sides of a sheet of insulation to form a subassembly of the armature;

FIG. 7 is a cross-sectional view of the subassembly shown in FIG. 6;

FIG. 8 is a partial side elevational view of the subassembly shown in FIG. 6 after the sheets of conductive material have been severed to form individual conductor segments;

Figure 3:
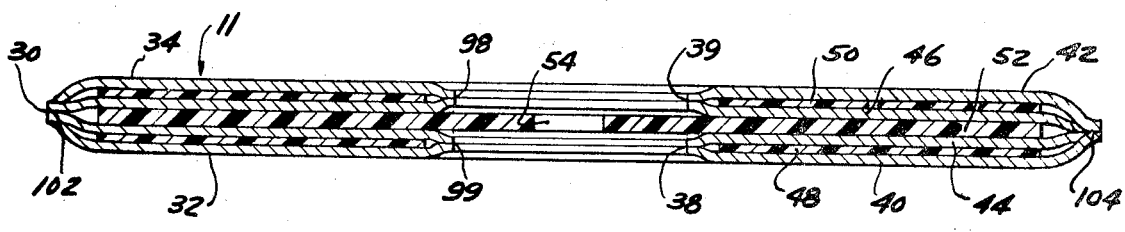
FIG. 3 is an enlarged, partially schematic, cross-sectional view taken generally along the line 3—3 in FIG. 2.

FIG. 9 is a partial sectional view taken along the line 9—9 in FIG. 8 and showing the subassembly of FIG. 6 after the individual conductor segments have been connected along the inner periphery of the subassembly; and FIG. 10 is a partial perspective view of a pair of subassemblies as shown in FIG. 9 positioned on opposite sides of a sheet of insulation prior to assembly and connection as shown in FIG. 3.

Figure 1:
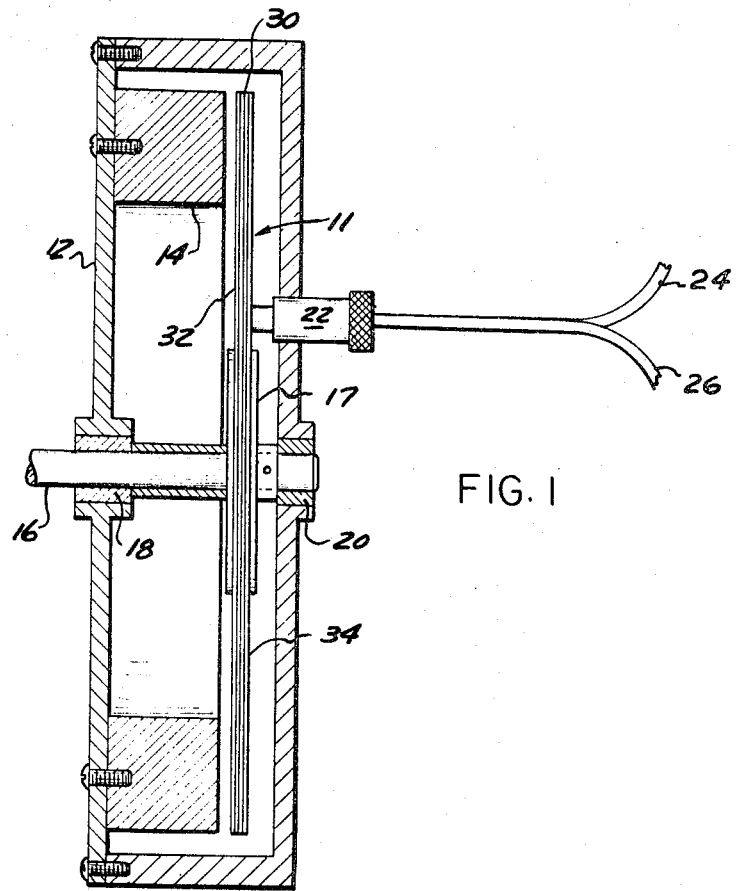
FIG. 1 is a sectional view of a schematic illustration of a motor assembly having an armature incorporating the inventive principles.

The present invention is incorporated in a disc-type armature 11 for an electric motor assembly shown schematically in FIG. 1 and comprising: in general, a casing 12, a permanent magnet assembly 14 providing a plurality of magnetic poles, an output shaft 16 fixedly connected to the armature in any suitable manner, as for example, by an insulating hub 17 and rotatably supported in suitable bearing means 18, 20, and conventional brush means 22 adapted to electrically connect the winding of the armature 11 to a power source through conductors 24, 26. It is to be understood that the brush means shown in merely illustrative of any of the many possible brush arrangements for wave windings which may include two or more brushes, depending on the number of magnetic poles, located on the same or opposite sides of the disc and spaced in accordance with conventional practice. The details of operation of such apparatus are well-known in the electric motor art to which this invention relates and are, therefore, not explained herein in detail.

Figure 2:
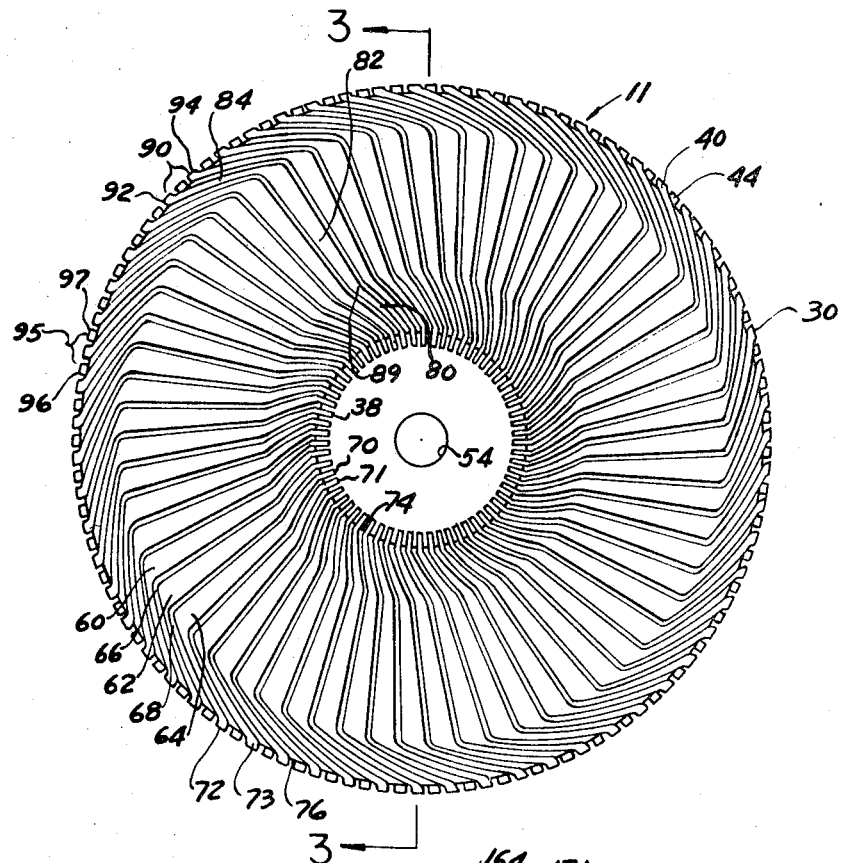
FIG. 2 is a side elevational view of the armature shown in FIG. 1.

Referring now to FIGS. 2 and 3, the armature 11 comprises a laminated disclike assembly of conductive and insulating laminae having a substantially circular outer periphery 30, substantially flat parallel side surfaces 32, 34 and circular inner peripheral portions 38, 39 defined by the inner ends of the conductive laminae. It may be noted that the width of the disc 11 between the opposite parallel faces 32, 34 is very small compared with the outer diameter of the disc.

The disc has a laminated form, as shown in cross section in FIG. 3, and comprises, in the preferred embodiment, thin outer layers 40, 42 of conductive material and thin inner layers 44, 46 of conductive material. The conductive material is preferably copper or the like in sheet form. The outer layers of conductive material are separated from the inner layers of conductive material by thin layers of insulation 48, 50 and the inner layers of conductive material 44, 46 are also electrically insulated by a layer of insulation material 52 which extends inwardly beyond the inner extremities of the conductor segments. Suitable mounting means are provided to attach the armature to the shaft 16. In the illustrative embodiment, the mounting means is integrally formed in the central portion of the insulation layer 52 by, for example, a central opening 54 adapted to receive the hub 17. It is to be understood that mounting means may be variously embodied and that the opening 54 may be deleted or changed in location and size. It is to be understood that the thickness of the layers is somewhat exaggerated in the drawings and that the layers of conductive material may be as thin as possible while still providing the required current carrying capacity, the required rigidity and stiffness permitting formation of the conductor segments of each layer by cutting operations in sheet material, the required wear characteristics in the areas of brush contact, and permitting handling during assembly operations. The thickness of the layers of insulation is made as thin as possible while still providing reliable insulation under the conditions of assembly and use.

Referring again to FIG. 2, each layer of conductive material comprises a plurality of circumferentially spaced similarly contoured individual conductor segments 60, 62, 64, etc., which extend generally radially. The individual conductor segments are separated from one another, in the preferred embodiment, by substantially equal width, equally spaced slots 66, 68. Each of the conductor segments terminate in relatively narrow, in circumferential width, tab portions 70, 71, etc., and 72, 73, etc. which extend, respectively, radially inwardly beyond the inner periphery 74 of the outer insulation layers 48, 50 and radially outwardly beyond the outer periphery 76 of the insulation layers 48, 50, 52.

In the preferred embodiment, each of the conductor segments comprises a curved inner portion 80, a central substantially straight portion 82, which is slightly inclined relative to a radial line, and an outer curved portion 84. It is to be understood that other configurations may also be utilized such as, for example, a completely radially extending central portion 82. Portions of the outer layer conductor segments are used as commutator bars as shown, for example, in U.S. Pat. No. 3,203,334. In the preferred embodiment, the brush means 22 are mounted for engagement with the conductor segments at or adjacent the juncture 89 between the inner curved portion 80 and the straight portion 82. It is to be understood that the brush means may be otherwise variously located. A substantial gap 90 is provided between adjacent outer tabs 92, 94 in each outer layer 40, 42 and a substantial gap 95 is provided between adjacent outer tabs 96, 97 of each inner layer 44, 46. Gaps 90, 95 are circumferentially wider than adjacent tabs 92, 94, 96, 97.

The characteristic of the half turn conductor segments in the preferred embodiment of being inclined relative to a radial line aids rigidity and maximizes the length of the straight portion 82 while reducing the length of the end portions 80, 84. Each outer tab 72, 73, etc. is displaced a specific angular distance from the associated inner tabs 70, 71, etc., equal to $$\frac{360}{p}\left(1-\frac{2}{z}\right)°$$ for a retrogressive winding and to $$\frac{360}{p}\left(1+\frac{2}{z}\right)$$ for a progressive winding where $p$ is the number of poles and $z$ is the total number of half turn conductor segments in the winding. The slots 66, 68 are preferably substantially uniform in width, as may be seen in FIG. 2, facilitating the formation of the conductor segments in sheet material by relatively simple cutting operations such as punching. Alternatively, the conductor segments might be made of uniform width with the slots having a uniform taper. The particular configuration of the conductor segments shown makes the armature assembly extremely rigid even though the diameter of the disc is extremely large relative to the thickness.

Referring again to FIGS. 2 and 3, the disc assembly is provided with a wave-type winding by electrically connecting the individual conductor segments in each layer to individual conductor segments in the other layers in a particular manner. Each of the inner rim tabs 70, 71, etc. of each conductor segment of the outer layers 40, 42 are connected to a similar tab on one of the conductor segments of the next adjacent inner layers 44, 46, respectively, as shown at 99, 98. The outer tabs 96, 97, etc., of each conductor segment of the inner layers 44, 46 are connected as shown at 102 and the outer tabs 92, 94, etc., of outer layers 40, 42 are similarly connected at 104.

The individual layers of half turn conductor segments 40, 42, 44, 46 are oriented in a particular manner relative to one another. Alternate layers of conductor segments are inclined in opposite directions so that the winding progresses circumferentially in the same direction. For example, the conductor segments in layer 40 are inclined oppositely to the conductor segments in layer 42 as illustrated in FIG. 10. The conductor segments in layer 44 extend oppositely to the conductor segments in layer 40 and extend in the same direction as the conductor segments in layer 42. The conductor segments in layer 46 are inclined oppositely to the conductor segments in layers 42 and 44, and are in the same direction as the conductor segments in layer 40.

Each layer of half turn conductor segments is concentrically positioned in such an angular relation to all other layers that a particular tab alignment is obtained which enables a wave winding to be formed by electrical connection of the aligned tabs as at 98, 99 and 102, 104 in FIG. 3. In other words, the tabs of each of the half turn conductor segments are connected to tabs of half turn conductor segments in other layers so as to provide a continuous current path formed from all the conductor segments and extending repetitively from layer to layer and circumferentially as shown schematically in FIG. 4. The darkened line 105 represents a portion of the winding providing a complete circumferential traverse of the armature. Assuming, for purposes of illustration, a starting point at a tab connection 106 in an exposed layer 40 and moving in a counterclockwise direction in FIG. 4, a complete traverse would terminate at 107 at the next adjacent tab connection in a retrogressive wave winding. Assuming, the half turn represented by the portion of the line 108 to be in an exposed layer of conductor segments, the half turns represented by the broken portions 110, 111 of the line 105 would be in inner layers of conductor segments behind the exposed layer and the broken portion 109 would be in the other exposed layer of conductor segments. Thus, the solid portions 108 of the line 105 may illustratively represent half turns in layer 40 and the dashed portions 109, 110, 111 of the line 105 represent, respectively, half turns in the layers 42, 46, 44 which would be traversed by current traveling through the winding from point 106 to point 107. The next adjacent exposed half turn is illustrated by solid line 112. A complete tracing of the wave winding would show that each half turn was connected in series with the other half turns and that the wave winding was continuous. The winding is in effect formed from a plurality of multiple turn coils, each coil comprising, in the preferred embodiment, four half turns and traversing each layer from, for example, the point 106 to the point 113. In the illustrative embodiment, for example, 63 half turn conductor segments are provided in each layer. Each pair of inner and outer layers provides a total of 126 half turn conductor segments or 63 turns; and the armature has a total of 252 half turn conductor segments, 126 total turns, and 63 two-turn coils. It is contemplated that the presently preferred embodiment of four layers of conductor segments might be replaced by 6, 8, 12 or other multiple layer combinations. In order to provide equal numbers of conductor segments in each of the layers of the armature it is necessary that the total number of conductor segments be evenly divisible by the number of layers. For example, in the illustrative embodiment, the total number of conductor segments is 252 which is evenly divisible by four to provide 63 conductor segments for each of the four layers of the armature. If, for example, an eight-layer disc of equal half turns per layer were to be provided, the total number of conductor segments would have to be a number, such as 80, 200, 320, etc., capable of being divided into eight equal numbered layers of conductor segments. Although the provision of layers of equal numbered conductor segments is presently preferred and is particularly advantageous in many respects, it is also contemplated that the inventive principles may be applied to winding arrangements utilizing varying numbers of layers and/or varying numbers of conductor segments per layer.

In the preferred embodiment, 10 magnetic poles are provided by the magnet assembly 14 and consist of five pole pairs of equally spaced alternate north and south poles as indicated schematically by superimposing the symbols N, S on the wave winding in FIG. 4. An odd number of pole pairs is preferred. Other odd numbers of pole pairs such as 3, 7, etc., may be utilized. An odd number of pole pairs allows the number of turns to exceed or be less than an odd multiple of the number of pole pairs by one, implementing a retrogressive or progressive wave winding, and still allowing the total number of half turns to be evenly divisible by an even number of laminae.

In the preferred embodiment, the conductor segments are made from thin copper sheet and may have a thickness, for example, of approximately 0.005 inches. The individual conductor segments in each layer may be spaced approximately one thirty-seconds of an inch by cutting the separating slots to that dimension. The insulation layers may be made from any suitable insulation material and preferably are made as thin as possible. For example, epoxy glass with adhesive on both sides may be used to mount the conductor segments and to insulate the segments from one another. Alternatively, an adhesive insulating film or coating may be used to obtain minimum thickness. In such applications, the thickness of the insulator may be approximately 0.004 inches. Thus, it may be seen that with an armature made from four layers of copper conductor segments having a thickness of approximately 0.005 inches and three insulating layers having a thickness of approximately 0.004 inches, would have a total thickness of 0.032 inches as compared with a diameter of, for example, 5 inches.

Figure 5:
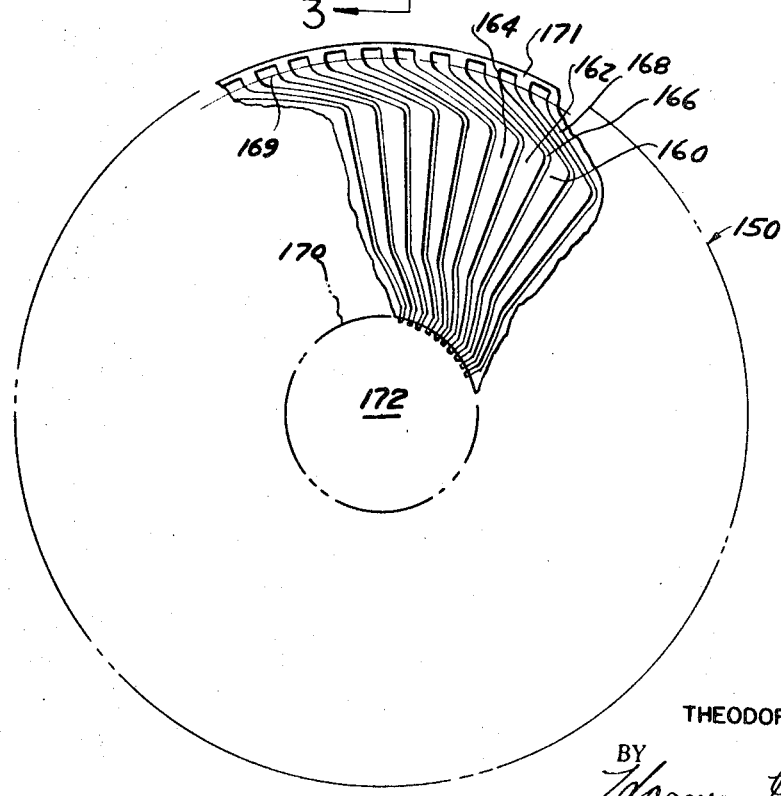
FIG. 5 is a side elevational view of an assembly part formed from a sheet of conductive material and used to form the armature of FIG. 1.

Referring now to FIG. 5, a conductor segment lamina assembly part 150 is shown in which conductor segments 160, 162, 164, etc., are formed by separating slots 166, 168, etc. The assembly part is preferably formed from thin copper conductor sheet material for use as an integral one piece lamina in an intermediate manufacturing stage prior to final assembly and formation of the disc-type armature 11. The lamina may have any suitable peripheral configuration such as circular, square, rectangular, etc., and may be initially separately formed or integrally connect in continuous strips of sheet material. A plurality of conductor segments 160, 162, 164 are formed in the lamina by essentially radial slots 166, 168. The outer ends of said slots extend outwardly to or beyond circle 169 and the inner ends of said slots extend inwardly to or beyond circle 170. Integral connecting means are provided for the individual conductor segments at at least one end by portions of the lamina within circle 170 and/or outside circle 169. The conductor segments are thus held in proper spaced relationship during subsequent assembly operations. In the illustrative embodiment, the connecting means are shown to comprise outer connecting means 171 and inner connecting means 172. The connecting means may take the form of an annular rim as shown at 171 or a disclike central portion, shown at 172, of a sheet of copper from which the conductor segments are formed. The conductor segments are subsequently severed from the connecting means to form individual conductor segments having inner and outer connecting tabs terminating along the circles 169, 170. The part components, i.e., the conductor segments and connecting means may be formed by simultaneously cutting the entire part from the sheet stock. It is proposed to form all of the layers of conductor segments in the armature from identical laminae. Therefore, the lamina 150 may be mass produced in a completely separate manufacturing operation and stored in quantity until assembly. Conventional punching operations may be utilized to form the laminae.

In the preferred assembly method, pairs of identical laminae are first united to form identical subassemblies and subsequently the disc armature is formed from the subassemblies. The first step in the formation of the subassemblies is shown in FIGS. 6 and 7 and comprises reversely positioning a pair of the punched conductor segment laminae in parallel spaced relationship to form two layers of conductor segments located on opposite sides of suitable insulation means with their respective patterns of conductor segments in concentric relationship. For example, in the formation of a subassembly 177 as shown in FIGS. 6 and 7, a first lamina 178 and a second identical lamina 179 are positioned on opposite sides of suitable insulator means 180 which may take the form of a film or sheet of insulating material. A circular inner peripheral edge 181 is radially outwardly spaced from the inner ends of the slots between conductor segments and a circular outer peripheral edge 182 is radially inwardly spaced from the outer ends of the slots between conductor segments so that annular uninsulated radially extending slots 184, 185 extend between the adjacent integral connecting rim portions of the spaced conductor segment laminae 178, 179.

The conductor segment laminae are reversely positioned as shown in FIG. 6 and oriented relative to one another until all the oppositely spaced inner tab portions 186, 187 of the conductor segments are aligned. The outer tab portions 188, 190 in each layer of conductor segments are thereby misaligned and located substantially centrally between adjacent outer tab portions on opposite lamina. The laminae are secured in place in proper alignment on opposite sides of the insulating material in any suitable manner by, for example, being adhesively bonded to the insulation material. Other methods of bonding or securing the conductive sheets on the insulation material may be utilized if desired.

Referring now to FIGS. 8 and 9, after the conductor laminae and the insulation means of a subassembly are secured in place, as shown in FIGS. 6 and 7, inner and outer connecting tabs 191, 192, etc. and 193, 194, etc. are formed in one layer and inner and outer connecting tabs 195, 196, etc. and 197, 198, etc. are formed in the other layer along the inner and outer circles 169, 170, by, for example, slotting the rims or by severing the conductors as hereinbefore described. If the conductor segments are otherwise formed, the slotting or severing operation may be dispensed with entirely or may be performed at a different time in the assembly sequence. However, in the preferred embodiment, the conductor segments must be first aligned and secured on the insulating material before the slotting or severing operation takes place to maintain the conductor segment spacing. In any event, substantial gaps 199, 200 separate the conductor segment tabs.

The formation of the subassembly 177 is completed, after the conductor segments in each layer have been separated and the tab portions formed, by electrically connecting the aligned inner tabs to one another by a suitable operation such as spot welding. In the preferred embodiment, each pair of the oppositely aligned inner tabs are mechanically displaced inwardly into abutting engagement in a plane located substantially centrally of the assembly and connected as indicated at 201 in FIG. 9 to form a good electrical connection between one conductor segment on one side of the insulation material and another reversely positioned conductor segment on the other side of the insulation material. Completion of the connection of the inner tabs forms a subassembly for the armature which comprises a pair of insulated layers of equally spaced half turn conductor segments extending circumferentially in opposite directions in each layer with contact tabs on the inner ends of the conductor segments in one layer aligned with and connected to similar contact tabs on the inner ends of the conductor segments in the other layer on the other side of the insulating material. Each of the conductor segments is, therefore, connected to another conductor segment on the opposite side of the insulation means at the inner periphery forming a single turn with open unconnected contact tabs at each of its outer ends in circumferentially spaced relation to the next adjacent outer contact tabs in the same layer and circumferentially spaced relation to similar outer contact tabs in the other layer on the opposite side of the insulation means.

The next step in the assembly process comprises the association of two or more of the subassembly forms of FIGS. 8, 9 to form the armature 11. As shown schematically in FIG. 10, a pair of the subassemblies 177a, 177b are positioned on opposite sides of suitable insulation means 52 in reverse orientation so that the conductor segments 210, 212 in the outer layers extend circumferentially oppositely and so that the conductor segments 214, 216 in the inner layers extend circumferentially oppositely. The outer tabs 218, 220 of the conductor segments in the outer layers are aligned as indicated by the dashed line 222 and the outer tabs 224, 226 of the conductor segments in the inner layers are aligned as indicated by the dashed line 228. The subassemblies are secured around the insulation means 52 which may be in the form of a thin sheet or film material, to form a unitary structure with the tabs 218, 220 and 224, 226 in alignment. The outer diameter of the insulation means is somewhat less than the outer diameter of the conductor segments to enable a good electrical connection to be obtained between the tab means.

After the subassemblies 177a, 177b are properly associated, the aligned tabs are electrically connected in any suitable manner. In the preferred embodiment, the aligned tabs are bent inwardly and electrically connected to one another by spot welding in a common plane located substantially centrally of the armature. The electrical connection may be made by any other suitable means such as a separate connecting conductor element and by other processes such as soldering, swaging, etc. Thus, the conductor segments are connected in series and form a continuous current path extending circumferentially around the armature through each of the conductor segments.

The portion of the current path in a single coil of the winding and traversing all layers once comprises, for example, a path which extends substantially radially outwardly along one of the half turn conductor segments in the outer layer 40 of FIG. 3 from the inner periphery of the armature to a circumferentially displaced portion on the outer periphery of the armature. At the outer periphery, the conductor segment is connected to an adjacent conductor segment in the outer layer 42 on the opposite side of the armature by integrally connected outer tabs. The conductor segment in the outer layer 42 on the other side of the armature provides a conductive path back radially inwardly to the inner periphery of the armature and further circumferentially displaced. Inner tabs connect the conductor segment in outer layer 42 to an adjacent conductor segment in inner layer 46. The conductive path then continues radially outwardly from the inner periphery to a further circumferentially displaced position on the outer periphery of the armature whereat the outer tabs of the adjacent conductor segments in the inner layers 44, 46 are connected. The current path then continues in a conductor segment in the other inner layer 44 radially inwardly to a further circumferentially displaced position on the inner periphery for connection by inner tabs to another one of the conductor segments in the outer layer 40. The conductive current path sequence is repeated around the armature through all the coils in progressively circumferentially displaced positions including all the half turn conductor segments.

Although the specific constructional details and manufacturing methods disclosed have distinct advantages in many instances, the broad aspects of the invention may be otherwise variously embodied. For example, although four layers of conductor segments are utilized in the preferred embodiment, it is contemplated that disc-type armatures embodying the principles of the present invention may also utilize varying numbers of conductor segment layers and different numbers of conductor segments per layer. Furthermore, various principles herein disclosed may also be implemented by means of other manufacturing processes. For example, the particular means for attaining the electrical connection between the layers of conductor segments may be changed from spot welding to any other means providing good electrical connection between the contact tabs.

Since the illustrative embodiment of the invention is susceptible of modification, variation and change, it is intended that certain of the appended claims be construed to have a scope encompassing alternative embodiments of the inventive principles.

I claim:

1. A disc-type laminated armature for an electric motor comprising at least first, second, third, and fourth layers of conductor segments in spaced parallel relationship in successive order across the armature, the conductor segments in each layer forming identical patterns, the conductor segments in alternate layers being reversely positioned, tab portions on each conductor segment at the periphery of the first and fourth layers being electrically connected, tab portions on each conductor segment at the periphery of the second and third layers being electrically connected, tab portions on each conductor segment at the periphery of the first and second layers being electrically connected, tab portions on each conductor segment at the periphery of the third and fourth layers being electrically connected, and the electrical connections forming a wave winding with conductor segments in each of said layers connected in series alternately from said first layer to said second layer to said third layer to said fourth layer to said first layer.

2. The invention as defined in claim 1 and wherein said tabs are bent inwardly toward one another into abutting relationship and electrically connected in substantially a common plane equidistant between the layers.

3. The invention as defined in claim 2 and wherein the electrical connection is a spot weld between tabs.

4. A disc-type laminated armature for an electric motor comprising at least four layers of conductor segments, there being two outer layers and two inner layers therebetween arranged so as to provide in successive order across the armature a first outer layer and a second inner layer and a third inner layer and a fourth outer layer, each conductor segment comprising a central portion and, radially extending tab portions at the outer and inner periphery of said armature, slot means separating said conductor segments in each layer, the conductor segments in each layer forming identical patterns but with the conductor segments in alternate layers being reversely positioned, each of the tab portions at the outer periphery of the first and fourth outer layers being electrically connected, each of the tab portions at the outer periphery of the second and third inner layers being electrically connected, each of the tab portions at the inner periphery of the first outer layer and the second inner layer being electrically connected, each of the tab portions at the inner periphery of the third inner layer and the fourth outer layer being electrically connected, and the electrical connections forming a wave winding with conductor segments in each of said layers connected in series alternately from said first layer to said second layer to said third layer to said fourth layer to said first layer.

5. The invention as defined in claim 4 and wherein the portions of said slot means adjacent said tab portions at the outer periphery are substantially wider than the tab portions.

6. A disc-type armature for use with rotating electrical machinery comprising a sandwich of axially spaced parallel layers of electrical conductor means and electrical insulation means, said electrical conductor means in each layer being in the form of circumferentially spaced radially extending conductor segments, there being at least four layers of conductor segments including spaced outer layers and a plurality of inner layers, the pattern of conductor segments in each layer being identical, each conductor segment in each layer having a generally radially extending central portion and oppositely and generally circumferentially extending radially spaced end portions, each conductor segment in each layer being electrically connected progressively in series through said end portions to at least one other conductor segment in each other layer, and said progressively connected conductor segments forming at least one series wound wave winding including conductor segments in each layer, the pattern of connection of the conductor segments being identical throughout the winding.

7. The invention as defined in claim 6 and each layer of conductor segments having conductor segments of identical number and shape.

8. The invention as defined in claim 6 and each conductor segment in each layer being of identical shape.

9. The invention as defined in claim 6 and all of the conductor segments in each layer being electrically connected to all of the conductor segments in the same layer and electrically connected to all of the conductor segments in the other layers.

10. The invention as defined in claim 6 and having conductor segments in adjacent layers electrically connected by axially extending electrical connections extending directly between the conductor segments in each adjacent layer, and conductor segments in the outer layers being electrically connected by axially extending electrical connections extending directly between conductor segments in the outer layers.

11. The invention as defined in claim 6 and there being axially extending electrical connections between the layers of conductor segments circumferentially arranged along only two radially spaced circles.

12. The invention as defined in claim 11 and there being electrical connections between some of the adjacent layers arranged along one of said circles and axially spaced and substantially circumferentially aligned, and other electrical connections between adjacent layers arranged along the other of said circles and axially aligned with and circumferentially spaced from the electrical connections between the outer layers.

13. The invention as defined in claim 6 and said wave winding being formed by a plurality of coils terminating at conductor segments in said outer layers, each coil including one conductor segment in each of the inner layers connected in series to another conductor segment in said coil in each of the other adjacent layers, and each of the conductor segments in said outer layers in said coil being connected in series to another conductor segment in another coil in the opposite outer layers.

14. The invention as defined in claim 6 and said winding comprising a plurality of series connected coils progressing circumferentially about said disc armature, each coil including at least one conductor segment in each layer, and the conductor segments in each layer forming said coil being connected in series.

15. The invention as defined in claim 14 and each coil being terminated at opposite ends by a conductor segment in each of the outer layers, each coil including an electrical connection between each conductor segment in the outer layers and a conductor segment in each adjacent inner layer, and each conductor segment in said coil in said inner layers of conductor segments being electrically connected in series to the next adjacent conductor segment in said coil in said inner layers.

16. The invention as defined in claim 6 and there being axially extending electrical connections between conductor segments in the outer layers of conductor segments uniformly circumferentially spaced.

17. The invention as defined in claim 16 and there being at least one group of uniformly circumferentially spaced axially extending electrical connections between one set of adjacent layers of conductor segments located alternately between and circumferentially spaced relative to said axially extending electrical connections between conductor segments in the outer layers of conductor segments.

18. The invention as defined in claim 6 and there being only two electrical connections for each conductor segment, one electrical connection being located at one radial end portion and the other electrical connection being at the opposite radial end portion.

19. The invention as defined in claim 18 and wherein all of said electrical connections being equally spaced from the next adjacent electrical connections in said winding.

20. A disc-type laminated armature for an electric motor comprising at least four identical layers of conductor segments formed from sheet material and arranged in parallel layers, there being at least two outer end layers and two inside layers sandwiched between the end layers, the conductor segments extending generally radially, insulation means between adjacent layers separating the conductor segments, each conductor segment in each layer having radially spaced inner and outer connecting end portions, the end portions of each conductor segment being circumferentially offset, alternate layers of conductor segments being reversely positioned and extending oppositely to adjacent layers, the alternate layers being circumferentially indexed relative to one another to align each of the connecting end portions of each of the conductor segments in each layer with connecting end portions of the conductor segments in the other layers, the inner connecting end portions being connected across adjacent layers, the outer connecting end portions of inside layers being connected across adjacent layers, the outer connecting end portions of the outer end layers being connected whereby each of the aligned connecting end portions of each of the conductor segments are connected to form a wave winding.

21. The invention as defined in claim 20 and wherein the outer connecting end portions of conductor segments in each layer are separated by radially extending slots having a circumferential width greater than the circumferential width of the outer connecting end portions so that when the layers of conductor segments are reversely positioned and circumferentially indexed the outer connecting end portions of adjacent layers are circumferentially located opposite the slots separating the outer connecting end portions of the adjacent layer to permit electrical connections to be made within the slots.

22. An electrical rotary machine disc-type armature comprising more than two layers of conductor segments, the number of conductor segments in each layer being identical, the conductor segments being electrically interconnected in series from layer to layer and forming a series wave wound winding having conductor segments in each layer, the electrical interconnections between conductor segments extending from layer to layer and for each conductor segment in a layer being identical throughout the layer in that corresponding interconnections of all conductor segments in a layer extend between the same layers and have the same length and same form and are made in the same manner, and the winding comprising in succession conductor segments from different layers and extending from layer to layer through all layers to form successive circumferentially extending winding turns each composed of a number of conductor segments equal to the number of layers and having only one conductor segment in each layer.

23. The invention as defined in claim 22 and wherein there being four layers of conductor segments comprising two outer layers and two inner layers therebetween and being arranged so as to provide in successive order across the armature a first outer layer and a second inner layer and a third inner layer and a fourth outer layer, each conductor segment in each layer having connecting tab portions at the outer and inner periphery of the first and fourth outer layers being electrically connected, each of the tab portions at the outer periphery of the second and third inner layers being electrically connected, each of the tab portions at the inner periphery of the first outer layer and the second inner layer being electrically connected, each of the tab portions at the inner periphery of the third inner layer and the fourth outer layer being electrically connected, the electrical interconnections forming a wave winding with conductor segments in each of said layers connected in series alternately from said first layer to said second layer to said third layer to said fourth layer to said first layer.

24. In an electrical motor having N magnetic poles where N/2 equals an odd number, a disc-type armature comprising a plurality of conductor segments lying in four spaced layers, each layer having a number of conductor segments equal to $$\frac{N \cdot X}{4} + 1/2$$ where $x$ is an odd integer, resulting in a total number of conductor segments in the armature of $N**X \pm 2$, each layer being separated by insulation means and means connecting all said conductor segments and forming a retrogressive wave winding for $+\frac{1}{2}$ and $+2$, and a progressive wave winding for $-\frac{1}{2}$ and $-2$.

25. A disc-type laminated armature comprising an even number of layers 40, 42, 44, 46 of conductor segments 60 et seq. at least equal to four, the conductor segments in each layer forming identical patterns but with the conductor segments in alternate layers being reversely positioned, tab portions 70—73 at the inner and outer ends of each of said conductor segments, means 104 electrically connecting said tab portions 92, 94 at the outer ends of said conductor segments in the first 40 and fourth 42 layers, means 102 electrically connecting the tab portions 96, 97 at the outer ends of said conductor segments in the second 44 and third 46 layers, means 99 connecting tab portions at the inner ends of said conductor segments of the first 40 and second 44 layers, means 98 electrically connecting the tab portions at the inner ends of said conductor segments in the third 46 and fourth 42 layers, and the electrical connections of all of said tab positions forming a single uninterrupted wave winding with said conductor segments in each of the layers connected in series alternately from said first layer to said second layer to said third layer to said fourth layer to said first layer.

26. A disc-type laminated armature comprising four layers 40, 42, 44, 46 of conductor segments, each conductor segment comprising a substantially straight central portion 82 extending at an angle relative to a radial line, curved oppositely extending end portions 80, 84, radially extending tab portions 71, 72 on each of said conductor segments at the outer and inner periphery of said armature, slot means 90 separating said conductor segments in each layer, the conductor segments in each layer forming identical patterns but with the conductor segments in alternate layers being reversely positioned, the tab portions 92, 94 at the outer periphery of the first 40 and fourth 46 layers being electrically connected, the tab portions 96, 97 at the outer periphery of the second 44 and third 46 layers being electrically connected, the tab portions 99 at the inner periphery of the first 40 and second 44 layers being electrically connected, the tab portions 98 at the inner periphery of the third 46 and fourth 42 layers being electrically connected, and the electrical connections forming a wave winding with conductor segments in each of said layers connected in series alternately from said first layer to said second layer to said third layer to said fourth layer to said first layer.

UNITED STATES PATENT OFFICE
CERTIFICATE OF CORRECTION

Patent No. 3,549,928  Dated December 22, 1970

Inventor(s) Theodore F. Knapp

It is certified that error appears in the above-identified patent and that said Letters Patent are hereby corrected as shown below:

Column 2, line 32, "in" should be --is--. Column 4, line 37, after "63" insert --individual--. Column 10, line 37, (Claim 23) after "the" insert --armature, each of the tab portions of the outer periphery of the--; line 54 (Claim 24) "$\frac{N \cdot X}{4} + 1/2$" should be --$\frac{N \cdot X}{4} \pm 1/2$--; line 55 "$N**X \pm 2$" should be --$N \cdot X \pm 2$--.

Signed and sealed this 27th day of April 1971.

(SEAL)
Attest:

EDWARD M. FLETCHER, JR.
Attesting Officer

WILLIAM E. SCHUYLER, JR
Commissioner of Patent